No. 692,373. Patented Feb. 4, 1902.
M. D. SHIPMAN.
STUD MEMBER.
(Application filed May 1, 1900.)
(No Model.)

Witnesses

Madison D. Shipman, Inventor

250
UNITED STATES PATENT OFFICE.

MADISON D. SHIPMAN, OF DEKALB, ILLINOIS.

STUD MEMBER.

SPECIFICATION forming part of Letters Patent No. 692,373, dated February 4, 1902.

Application filed May 1, 1900. Serial No. 15,102. (No model.)

*To all whom it may concern:*

Be it known that I, MADISON D. SHIPMAN, a citizen of the United States, residing at Dekalb, in the county of Dekalb and State of Illinois, have invented certain new and useful Improvements in Stud Members; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to fastening devices of that type composed of two separable members, like a stud member and a socket member; and the object of the same is to provide means whereby the stud member may be secured in a fixed position to rigid materials by driving it in place in wood or similar material or in any place where it may be found necessary to secure one of the members rigidly and have the coacting member mounted upon flexible material to be engaged therewith. A device of this character may be used to advantage as a carriage-curtain fastener and for many other purposes. I attain this object by means of the construction shown in the accompanying drawings, which form a part of this specification, and in which—

Figure 1:
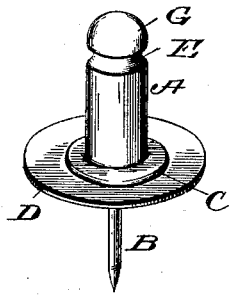
Figure 2:
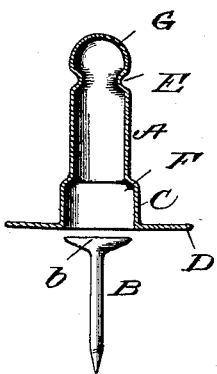
Figure 3:
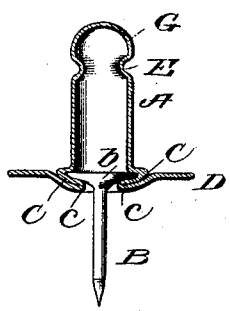
Figure 4:
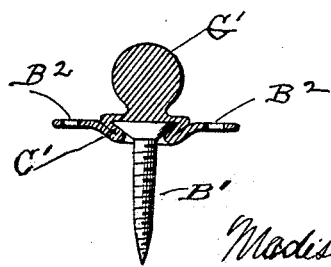

Figure 1 is a perspective view of the stud member of a fastening device and showing my invention. Fig. 2 is a central vertical section through the stud member and showing a nail in position to be inserted into the stud member prior to attaching it thereto and showing the position of the nail in dotted lines just previous to crimping or folding the material around the head. Fig. 3 is a central vertical section of the stud member having the head of a nail permanently secured in place. Fig. 4 is a central vertical section of a slightly-modified form of stud member provided with my invention.

Referring now to the drawings, A is a stud member of a fastener, and this stud may be of any suitable construction so long as it is provided with a hollow base portion or offset, to be hereinafter referred to. As shown in Figs. 1, 2, and 3, the stud member consists of a hollow shell rising from a base-flange D. The hollow portion C near the flange forms a recess within which a nail may be secured. The shoulder or offset F upon the inside of the stud provides a solid abutment for the head of the nail, while the outer portion of said offset serves as a support for a tubular driving-tool for attaching the nail to any suitable material, like wood. The stud may be tubular above the offset F, as shown in Figs. 1, 2, and 3, and provided with a groove E and a head G above said groove. It is not essential, however, that the stud be hollow above the offset portion, and, as shown in Fig. 4, the head is solid, and the groove E is formed at the junction of the head and the offset or shoulder. To secure the nail B to the stud, the head $b$ of the nail is inserted in the enlarged portion C until the head $b$ bears against the offset F, and then the metal of the shell is crimped or folded around the head to hold it firmly connected to the stud. The nail may then be driven into wood by a hollow tool which fits over the stud and bears upon the outer shoulder of the offset F.

The stud shown in Fig. 4 is provided with a solid head G', a hollow shell C', formed integral therewith, and a base-flange extending outward from the bottom of said shell.

It will be understood, of course, that the flange D may be omitted altogether for certain uses, the metal which surrounds the head of the nail forming a flange of sufficient extent for some purposes.

Instead of a non-resilient stud, such as shown, a spring stud member of any suitable type may have a nail secured to it in the manner described herein, and I do not desire to be limited in this particular.

Instead of a nail, as B, a screw or similar fastener B' may be used, and the flange may be provided with spanner-holes $B^2$.

It will be obvious from the foregoing that a stud member of a fastening device provided with means such as I have described and shown for attaching it rigidly to materials like wood has many uses in the arts and manufactures and gives extended scope to a very popular class of spring-fasteners heretofore used upon gloves and other garments.

Having thus fully described my invention, what I claim is—

1. A stud member of a separable fastening device consisting of a stud having a head, a groove below the head, an offset below the groove, and a base-flange, the material between the offset and the flange being folded around the head of a nail or screw, with the head of said nail or screw bearing against the interior shoulder formed by the offset.

2. A stud member of a separable fastener, consisting of a head, a groove, a hollow shell having an offset, and a nail or screw secured in the hollow shell against the offset by folds or crimps in the metal, substantially as described.

3. A stud member of a separable fastening device, comprising a hollow stem having a base-flange and an interior shoulder, and a headed tack or screw secured within said stud member by a double fold of the metal between the interior shoulder and the base-flange.

In testimony whereof I affix my signature in presence of two witnesses.

MADISON D. SHIPMAN.

Witnesses:
SAML. A. DRURY,
H. GLENN PHELPS.